United States Patent
Jovanovic (10) Patent No.: US 11,540,149 B2
(45) Date of Patent: *Dec. 27, 2022

(54) SYNCHRONIZATION AND FAULT MANAGEMENT IN A DISTRIBUTED ANTENNA SYSTEM

(71) Applicant: CommScope Technologies LLC, Hickory, NC (US)

(72) Inventor: Milun Jovanovic, Buchdorf (DE)

(73) Assignee: CommScope Technologies LLC, Hickory, NC (US)

( * ) Notice: Subject to any disclaimer, the term of this patent is extended or adjusted under 35 U.S.C. 154(b) by 6 days.

This patent is subject to a terminal disclaimer.

(21) Appl. No.: 17/067,188

(22) Filed: Oct. 9, 2020

(65) Prior Publication Data

US 2021/0029558 A1   Jan. 28, 2021

Related U.S. Application Data

(63) Continuation of application No. 16/217,382, filed on Dec. 12, 2018, now Pat. No. 10,805,811.

(Continued)

(51) Int. Cl.
*H04W 24/02*      (2009.01)
*H04W 56/00*      (2009.01)
(Continued)

(52) U.S. Cl.
CPC .......... *H04W 24/02* (2013.01); *H04L 43/087* (2013.01); *H04W 48/16* (2013.01); *H04W 56/001* (2013.01); *H04W 56/0035* (2013.01)

(58) Field of Classification Search
CPC ............... H04W 24/02; H04W 56/001; H04W 56/0035; H04W 48/16; H04L 43/087
See application file for complete search history.

(56) References Cited

U.S. PATENT DOCUMENTS 8,165,169 B2 * 4/2012 Hedin .................. H04J 3/0641
370/503
8,699,982 B2 * 4/2014 Singh .................. H04W 88/085
455/257

(Continued)

FOREIGN PATENT DOCUMENTS

WO    2011123635 A2    10/2011
WO    2014106981 A1    7/2014
WO    2016069061 A1    5/2016

OTHER PUBLICATIONS

European Patent Office, "Extended European Search Report from EP Application No. 18892249.6", from Foreign Counterpart to U.S. Appl. No. 16/217,382, filed Aug. 4, 2021, pp. 1 through 11, Published: EP.

(Continued)

*Primary Examiner* — Parth Patel
(74) *Attorney, Agent, or Firm* — Fogg & Powers LLC (57) ABSTRACT

In an embodiment, a method comprises: sending a message from a master unit of a distributed antenna system to a remote unit of the distributed antenna system, wherein the message includes a list of service frequencies and applied standards for a base station; sending a downlink signal generated based on a base station signal from the master unit to the remote unit; decoding the downlink signal based on the list of service frequencies and applied standards for the base station; extracting a base station clock signal from the decoded downlink signal; and synchronizing an internal clock of the remote unit to the base station clock using the extracted base station clock signal.

20 Claims, 6 Drawing Sheets

Related U.S. Application Data (60) Provisional application No. 62/607,238, filed on Dec. 18, 2017.

(51) Int. Cl.
*H04L 43/087* (2022.01)
*H04W 48/16* (2009.01)

(56) References Cited

U.S. PATENT DOCUMENTS

| | | | |
|---|---|---|---|
| 2008/0287153 A1* | 11/2008 | Fullam | H04N 21/4302 455/502 |
| 2010/0135276 A1* | 6/2010 | Hedin | H04J 3/0641 370/350 |
| 2010/0278530 A1* | 11/2010 | Kummetz | H04B 10/2575 398/41 |
| 2011/0280209 A1* | 11/2011 | Wegener | H03M 7/40 370/328 |
| 2012/0027145 A1* | 2/2012 | Uyehara | H04J 3/0685 375/356 |
| 2012/0106657 A1* | 5/2012 | Fischer | H04B 7/2606 375/259 |
| 2012/0177026 A1* | 7/2012 | Uyehara | H04B 1/18 370/345 |
| 2012/0314797 A1* | 12/2012 | Kummetz | H04L 27/34 375/295 |
| 2013/0017863 A1* | 1/2013 | Kummetz | H04W 28/08 455/562.1 |
| 2013/0083705 A1* | 4/2013 | Ma | H04L 5/14 370/280 |
| 2013/0107763 A1* | 5/2013 | Uyehara | H04B 7/024 370/278 |
| 2013/0128760 A1* | 5/2013 | Fujishima | H04W 72/04 370/252 |
| 2014/0050253 A1* | 2/2014 | Jovanovic | H04B 7/15507 375/211 |
| 2014/0243033 A1* | 8/2014 | Wala | H01Q 1/246 455/517 |
| 2015/0256972 A1 | 9/2015 | Markhovsky et al. | |
| 2015/0296527 A1 | 10/2015 | Ranson et al. | |
| 2015/0365501 A1 | 12/2015 | Uyehara et al. | |
| 2015/0365829 A1 | 12/2015 | Grayson et al. | |
| 2016/0044552 A1 | 2/2016 | Heo et al. | |
| 2016/0105880 A1 | 4/2016 | Bao et al. | |
| 2016/0192381 A1 | 6/2016 | Gao et al. | |
| 2017/0302340 A1 | 10/2017 | Berlin et al. | |
| 2018/0034617 A1 | 2/2018 | Zavadsky et al. | |
| 2018/0234267 A1 | 8/2018 | Rootsey et al. | |
| 2019/0082358 A1 | 3/2019 | Asterjadhi et al. | |
| 2019/0191318 A1 | 6/2019 | Jovanovic | |
| 2019/0277972 A1 | 9/2019 | Carter | |
| 2019/0319736 A1 | 10/2019 | Hanson | |

OTHER PUBLICATIONS

ETSI, "Transmission and Multiplexing (TM); Generic requirements for synchronization networks; Part 5-1: Timing characteristics of slave clocks suitable for operation in Synchronous Digital Hierarchy (SDH) equipment"; EN 300462-5-1 V1.1.2; European Standard (Telecommunications series); pp. 1 through 27; 1998.

ETSI; "Transmission and Multiplexing (TM); Generic requirements of transport functionality of equipment; Part 6-1: Synchronization layer functions"; EN 300 417-6-1 V1.1.3; pp. 1 through 113; 1999.

International Searching Authority, "International Search Report and Written Opinion from PCT Application No. PCT/US2018/065110 dated May 21, 2019", from Foreign Counterpart to U.S. Appl. No. 16/217,382, pp. 1 through 13, Published: WO.

ITU; "Series G: Transmission Systems and Media, Digital Systems and Networks Digital networks—Design objectives for digital networks Timing requirements of slave clocks suitable for use as node clocks in synchronization networks"; Telecommunication Standardization Sector of ITU; pp. 1 through 46; Jun. 2004; Published in Geneva, Switzerland.

Pupin Telecom; "Digital Public Switching System DKTS"; Jun. 1998; pp. 1 through 6.

U.S. Patent and Trademark Office, "Notice of Allowance", U.S. Appl. No. 16/217,382, dated Jun. 11, 2020, pp. 1 through 9, Published: US.

U.S. Patent and Trademark Office, "Office Action", U.S. Appl. No. 16/217,382, dated Jan. 30, 2020, pp. 1 through 20, Published: US.

\* cited by examiner

SYNCHRONIZATION AND FAULT MANAGEMENT IN A DISTRIBUTED ANTENNA SYSTEM

CROSS-REFERENCE TO RELATED APPLICATIONS

This application is a continuation of U.S. patent application Ser. No. 16/217,382, filed Dec. 12, 2018, and titled "SYNCHRONIZATION AND FAULT MANAGEMENT IN A DISTRIBUTED ANTENNA SYSTEM," which claims the benefit of U.S. Provisional Application Ser. No. 62/607,238, filed Dec. 18, 2017, and titled "SYNCHRONIZATION AND FAULT MANAGEMENT IN A DISTRIBUTED ANTENNA SYSTEM," the contents of all of which are incorporated herein by reference.

BACKGROUND

One way that a wireless cellular service provider can improve the coverage provided by a base station or group of base stations is by using a distributed antenna system (DAS). A DAS typically comprises one or more master units and one or more remote units that are communicatively coupled to the master units either directly or indirectly via one or more intermediate units or expansion units. One type of DAS is an analog DAS, in which DAS traffic is distributed between the master units and the remote units in analog form. Another type of DAS is a digital DAS, in which DAS traffic is distributed between the master units and the remote units in digital form.

SUMMARY

In an embodiment, a distributed antenna system comprises a master unit communicatively coupled to a base station; and a remote unit communicatively coupled to the master unit via a communication medium and located remotely from the master unit, wherein the remote unit includes an internal clock; wherein the master unit is configured to: send a message to the remote unit including a list of service frequencies and applied standards for the base station; send a downlink signal generated based on a base station signal to the remote unit; wherein the remote unit is configured to: decode the downlink signal based on the list of service frequencies and applied standards for the base station; extract a base station clock signal from the downlink signal; and synchronize the internal clock to the base station clock using the extracted base station clock signal.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

For a digital DAS, sub equipment, such as the master unit or remote unit performs analog to digital (A/D) and digital to analog (D/A) conversion of BTS and mobile phone signals. Also, switching of the payload signal (traffic) is performed in digital form. There are numerous benefits of a digital DAS. However, a concern with a digital DAS is timing or unpredictable delay caused by free running clocks at the sub equipment of the digital DAS (such as remote units). For example, when the clocks of various remote units run in free run mode without synchronization to a master clock and with asymmetric infrastructure of DAS system (different cable lengths), every signal path between a master unit and remote units will have different delay. Further, every path between the master unit and the remote units will have different delay and path delay variation will be directly influenced by local clock inaccuracy and instability.

As transmission of payload data to a base station and to a mobile phone should occur synchronously, the playout delay (output buffer size) should be optimized and accurate. Packets (payload signal) arriving at a regular rate will have to wait varying amounts of time in the output buffer dependent on the number of paths instantaneously contending for the same output (for example, base station uplink signal). The regularity of output traffic is disrupted when payload signal from different paths arrive at irregular intervals.

The main parameter affecting buffer dimensioning and playout delay is peak-to-peak path delay variation. An incorrectly dimensioned playout buffer (too large or too small) can create service interruptions. During longer time intervals, an inaccurate and/or unstable non-synchronal clock at sub equipment of the DAS will generate an unequal count of payload packets where one node will generate a greater number of packets while another node will generate a fewer number of packets.

Further, use of a jittered oscillator (clock) during A/D or D/A conversion will produce an output signal with a spectrum that will not match spectrum of input signal. Instead of ideal sinewave output of ADC, the output signal will contain frequency bins that do not appear in the input signal. The phase noise caused by clock jitter will reduce the overall spectral resolution. Further, clock jitter of one nanosecond immediately translates to dBs loss of signal path and reduces the resolution bandwidth of the signal.

For the reasons stated above and for other reasons stated below which will become apparent to those skilled in the art upon reading and understanding the specification, there is a need in the art for improvements to the synchronization and fault tolerance of a distributed antenna system.

Fully synchronized nodes of the DAS to the base station clock can improve correctly dimensioning the playout delay. Further, when timing is consistent throughout the DAS, the cumulative factor of a respective clock's phase noise to path jitter can be kept under control. Distributed timing through DAS with fully implemented synchronization can increase the likelihood of an equal number packets from all remote units and reduce the likelihood of service interruptions. Accurate and synchronal clock is needed at the edge of the DAS where constant bit streams are forwarded to at least one other interface.

Some embodiments of the present application include synchronization of the internal clocks of the nodes of the DAS with a higher ranking clock (for example, the base station clock). The internal clocks of the nodes of the DAS are synchronized with the base station clock signal by extracting a base station clock signal from downlink packets generated at the base station and distributed through the DAS. In order to achieve a more accurate synchronization of the internal clocks, the downlink signals are decoded by the nodes of the DAS using information provided by the front end unit that includes a list of service frequencies and applied standards in the base station RF signals that are forwarded to the specific node of the DAS. The front end unit of the DAS is capable of discovering deployed telecommunication standardized signals on the base station inputs, detecting absolute radio-frequency channel numbers (ARFCNs), and/or extracting frequencies and deployed telecommunication standards during signal decoding.

Some embodiments of the present application include mechanisms for fault tolerance and/or fault management when a node of the DAS experiences a failure. In some aspects, the front end unit and/or intermediate units can monitor uplink signals provided from the remote units and determine whether there has been a failure of a particular remote unit. In some aspects, the front end unit and/or intermediate units can monitor uplink packets that contain unique remote unit identifiers and are sent at a certain time interval by the remote units. If the front end unit and/or intermediate units determine that a remote unit has failed, the payload traffic for the faulty remote unit can be switched or otherwise redistributed to another remote unit in the same coverage zone.

Some embodiments of the present application include mechanisms for fault tolerance and/or fault management when a hardware component of the front end unit of the DAS fails. In some aspects, a redundant hardware design including primary and backup hardware is implemented in the front end unit and the front end unit switches operation to backup hardware components upon detection of a failure of the primary hardware components.

Figure 1:
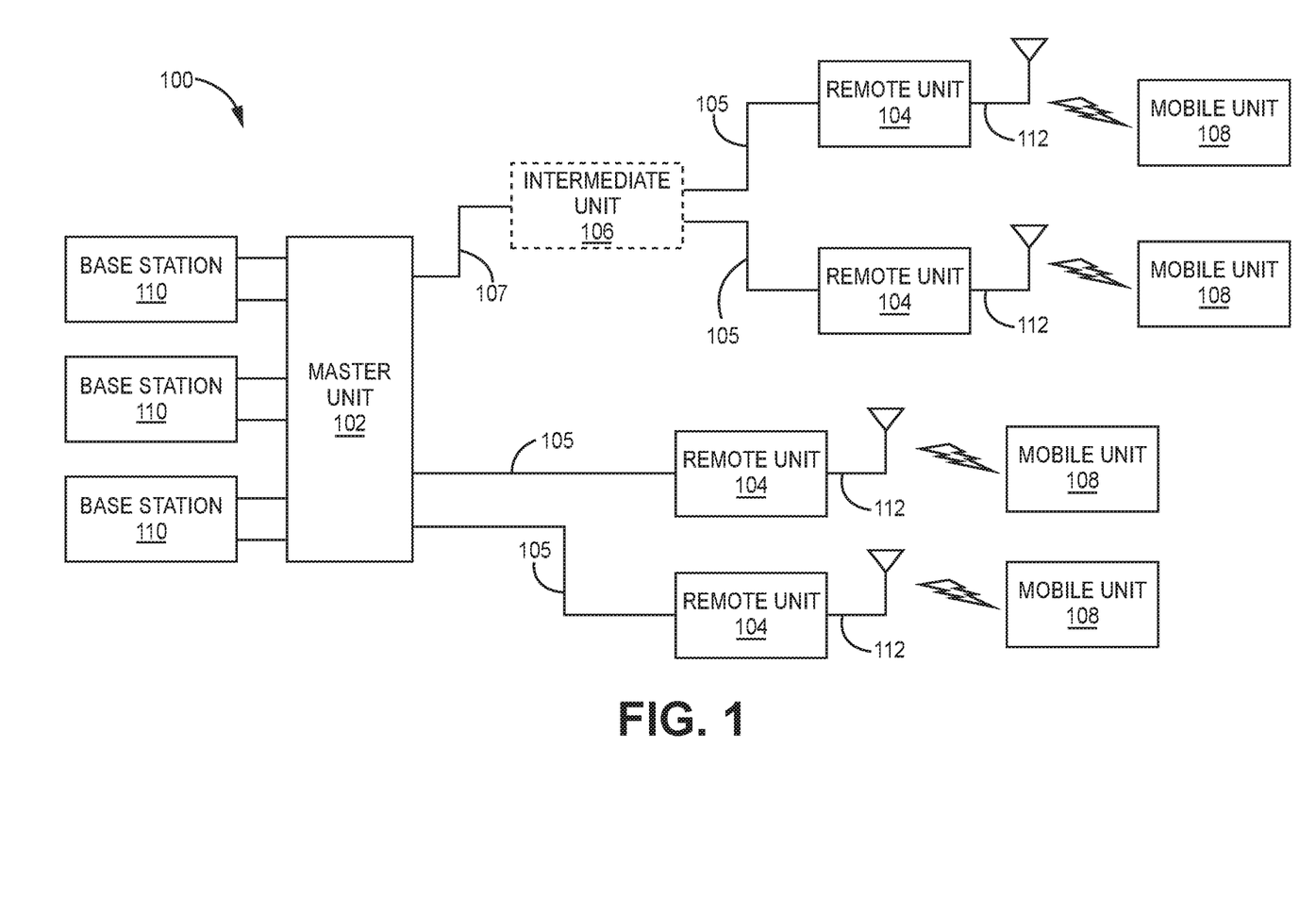
FIG. 1 is a block diagram of an example distributed antenna system according to an aspect of the present disclosure.

FIG. 1 is a block diagram of an example distributed antenna system (DAS) 100 in which the synchronization and fault management schemes described herein can be implemented.

DAS 100 comprises one or more master units 102 (also referred to as "host units", "headend units", or "front end units") and one or more remote antenna units 104 (also referred to as "remote units") that are communicatively coupled to the master units 102. In this exemplary embodiment, the DAS 100 comprises a digital DAS, in which DAS traffic is distributed between the master units 102 and the remote antenna units 104 in digital form. In other embodiments, the DAS 100 is implemented, at least in part, as an analog DAS, in which DAS traffic is distributed at least part of the way between the master units 102 and the remote antenna units 104 in analog form.

Each master unit 102 is communicatively coupled to one or more base stations 110. One or more of the base stations 110 can be co-located with the respective master unit 102 to which it is coupled (for example, where the base station 110 is dedicated to providing base station capacity to the DAS). Also, one or more of the base stations 110 can be located remotely from the respective master unit 102 to which it is coupled (for example, where the base station 110 is a macro base station providing base station capacity to a macro cell in addition to providing capacity to the DAS). In this latter case, a master unit 102 can be coupled to a donor antenna in order to wirelessly communicate with the remotely located base station 110.

The base stations 110 can be implemented as a traditional monolithic base station. Also, the base stations 110 can be implemented using a distributed base station architecture in which a base band unit (BBU) is coupled to one or more remote radio heads (RRHs), where the front haul between the BBU and the RRH uses streams of digital IQ (in-phase/quadrature) samples. Examples of such an approach are described in the Common Public Radio Interface (CPRI) and Open Base Station Architecture Initiative (OBSAI) families of specifications.

The master units 102 can be configured to use wideband interfaces or narrowband interfaces to the base stations 110. Also, the master units 102 can be configured to interface with the base stations 110 using analog radio frequency (RF) interfaces or digital interfaces (for example, using a CPRI or OBSAI digital IQ interface). In some examples, the master units 102 interface with the base stations 110 via one or more wireless interface nodes (not shown). A wireless interface node can be located, for example, at a base station hotel, and group a particular part of a RF installation to transfer to the master unit 102.

Traditionally, each master unit 102 interfaces with one or more base stations 110 using the analog radio frequency signals that each base station 110 communicates to and from mobile units using a suitable air interface standard. The DAS operates as a distributed repeater for such radio frequency signals. RF signals transmitted from each base station 110 (also referred to herein as "downlink RF signals") are received at one or more master units 102. Each master unit 102 uses the downlink RF signals to generate a downlink transport signal that is distributed to one or more of the remote antenna units 104. Each such remote antenna unit 104 receives the downlink transport signal and reconstructs a version of the downlink RF signals based on the downlink transport signal and causes the reconstructed downlink RF signals to be radiated from at least one antenna 112 coupled to or included in that remote antenna unit 104.

A similar process is performed in the uplink direction. RF signals transmitted from mobile units (also referred to herein as "uplink RF signals") are received at one or more remote antenna units 104. Each remote antenna unit 104 uses the uplink RF signals to generate an uplink transport signal that is transmitted from the remote antenna unit 104 to a master unit 102. Each master unit 102 receives uplink transport signals transmitted from one or more remote antenna units 104 coupled to it. The master unit 102 combines data or signals communicated via the uplink transport signals received at the master unit 102 and reconstructs a version of the uplink RF signals received at the remote antenna units 104. The master unit 102 communicates the reconstructed uplink RF signals to one or more base stations 110. In this way, the coverage of the base stations 110 can be expanded using the DAS.

As noted above, in the exemplary embodiment shown in FIG. 1, the DAS is implemented as a digital DAS. In a "digital" DAS, signals received from and provided to the base stations 110 and mobile units are used to produce digital in-phase (I) and quadrature (Q) samples, which are communicated between the master units 102 and remote antenna units 104. It is important to note that this digital IQ (in-phase/quadrature) representation of the original signals received from the base stations 110 and from the mobile units still maintains the original modulation (that is, the change in the amplitude, phase, or frequency of a carrier) used to convey telephony or data information pursuant to the cellular air interface protocol used for wirelessly communicating between the base stations 110 and the mobile units. Examples of such cellular air interface protocols include, for example, the Global System for Mobile Communication (GSM), Universal Mobile Telecommunications System (UMTS), High-Speed Downlink Packet Access (HSDPA), and Long-Term Evolution (LTE) air interface protocols. Also, each stream of digital IQ samples represents or includes a portion of wireless spectrum. For example, the digital IQ samples can represent a single radio access network carrier (for example, a UMTS or LTE carrier of 5 MHz) onto which voice or data information has been modulated using a UMTS or LTE air interface. However, it is to be understood that each such stream can also represent multiple carriers (for example, in a band of frequency spectrum or a sub-band of a given band of frequency spectrum).

In the exemplary embodiment shown in FIG. 1, one or more of the master units 102 are configured to interface with one or more base stations 110 using an analog RF interface (for example, either a traditional monolithic base station or via the analog RF interface of an RRH). The base stations 110 can be coupled to the master units 102 using a network of attenuators, combiners, splitters, amplifiers, filters, cross-connects, etc., (sometimes referred to collectively as a "point-of-interface" or "POI"). This is done so that, in the downstream, the desired set of RF carriers output by the base stations 110 can be extracted, combined, and routed to the appropriate master unit 102, and so that, in the upstream, the desired set of carriers output by the master unit 102 can be extracted, combined, and routed to the appropriate interface of each base station 110.

In the exemplary embodiment shown in FIG. 1, in the downstream, each master unit 102 can produce digital IQ samples from an analog wireless signal received at radio frequency (RF) by down-converting the received signal to an intermediate frequency (IF) or to baseband, digitizing the down-converted signal to produce real digital samples, and digitally down-converting the real digital samples to produce digital in-phase (I) and quadrature (Q) samples. These digital IQ samples can also be filtered, amplified, attenuated, and/or re-sampled or decimated to a lower sample rate. The digital samples can be produced in other ways. Each stream of digital IQ samples represents a portion of wireless radio frequency spectrum output by one or more base stations 110. Each portion of wireless radio frequency spectrum can include, for example, a band of wireless spectrum, a sub-band of a given band of wireless spectrum, or an individual wireless carrier.

Likewise, in the upstream, each master unit 102 can produce an upstream analog wireless signal from one or more streams of digital IQ samples received from one or more remote antenna units 104 by digitally combining streams of digital IQ samples that represent the same carriers or frequency bands or sub-bands (for example, by digitally summing such digital IQ samples), digitally up-converting the combined digital IQ samples to produce real digital samples, performing a digital-to-analog process on the real samples in order to produce an IF or baseband analog signal, and up-converting the IF or baseband analog signal to the desired RF frequency. The digital IQ samples can also be filtered, amplified, attenuated, and/or re-sampled or interpolated to a higher sample rate, before and/or after being combined. The analog signal can be produced in other ways (for example, where the digital IQ samples are provided to a quadrature digital-to-analog converter that directly produces the analog IF or baseband signal).

In the exemplary embodiment shown in FIG. 1, one or more of the master units 102 can be configured to interface with one or more base stations 110 using a digital interface in addition to (or instead of) interfacing with one or more base stations 110 via an analog RF interface. For example, the master unit 102 can be configured to interact directly with one or more BBUs using the digital IQ interface that is used for communicating between the BBUs and an RRHs (for example, using the CPRI serial digital IQ interface).

In the downstream, each master unit 102 terminates one or more downstream streams of digital IQ samples provided to it from one or more BBUs and, if necessary, converts (by re-sampling, synchronizing, combining, separating, gain adjusting, etc.) them into downstream streams of digital IQ samples compatible with the remote antenna units 104 used in the DAS. In the upstream, each master unit 102 receives upstream streams of digital IQ samples from one or more remote antenna units 104, digitally combining streams of digital IQ samples that represent the same carriers or frequency bands or sub-bands (for example, by digitally summing such digital IQ samples), and, if necessary, converts (by re-sampling, synchronizing, combining, separating, gain adjusting, etc.) them into upstream streams of digital IQ samples compatible with the one or more BBUs that are coupled to that master unit 102.

In the downstream, each remote antenna unit 104 receives streams of digital IQ samples from one or more master units 102, where each stream of digital IQ samples represents a portion of wireless radio frequency spectrum output by one or more base stations 110.

In some aspects, the master units 102 are directly coupled to the remote antenna units 104. In such aspects, the master units 102 are coupled to the remote antenna units 104 using a communication medium 105. For example, the communication medium 111 can include optical fiber, coaxial cable, twisted pair, and Category cable (such as used for Ethernet and other communications) complying with the Category 5, Category 5e, Category 6, Category 6A, or Category 7 specifications. Future communication medium specifications used for DAS transport (including Ethernet or other signals) are also within the scope of the present disclosure.

In some aspects, one or more intermediate units 106 (also referred to as "expansion units", "transport expansion nodes", or "concentrators") can be placed between the master units 102 and one or more of the remote antenna units 104. This can be done, for example, in order to increase the number of remote antenna units 104 that a single master unit 102 can feed, to increase the master-unit-to-remote-antenna-unit distance, and/or to reduce the amount of cabling needed to couple a master unit 102 to its associated remote antenna units 104. In an example, a single intermediate unit 106 can be positioned on each floor of a building and one or more remote antenna units 104 can be coupled to the intermediate unit 106 for distribution of the payload traffic for a respective floor. The intermediate units 106 are coupled to the master unit 102 via one or more communication links 107. In exemplary embodiments, the communication links includes optical communication links or other wired communication medium.

Figure 2:
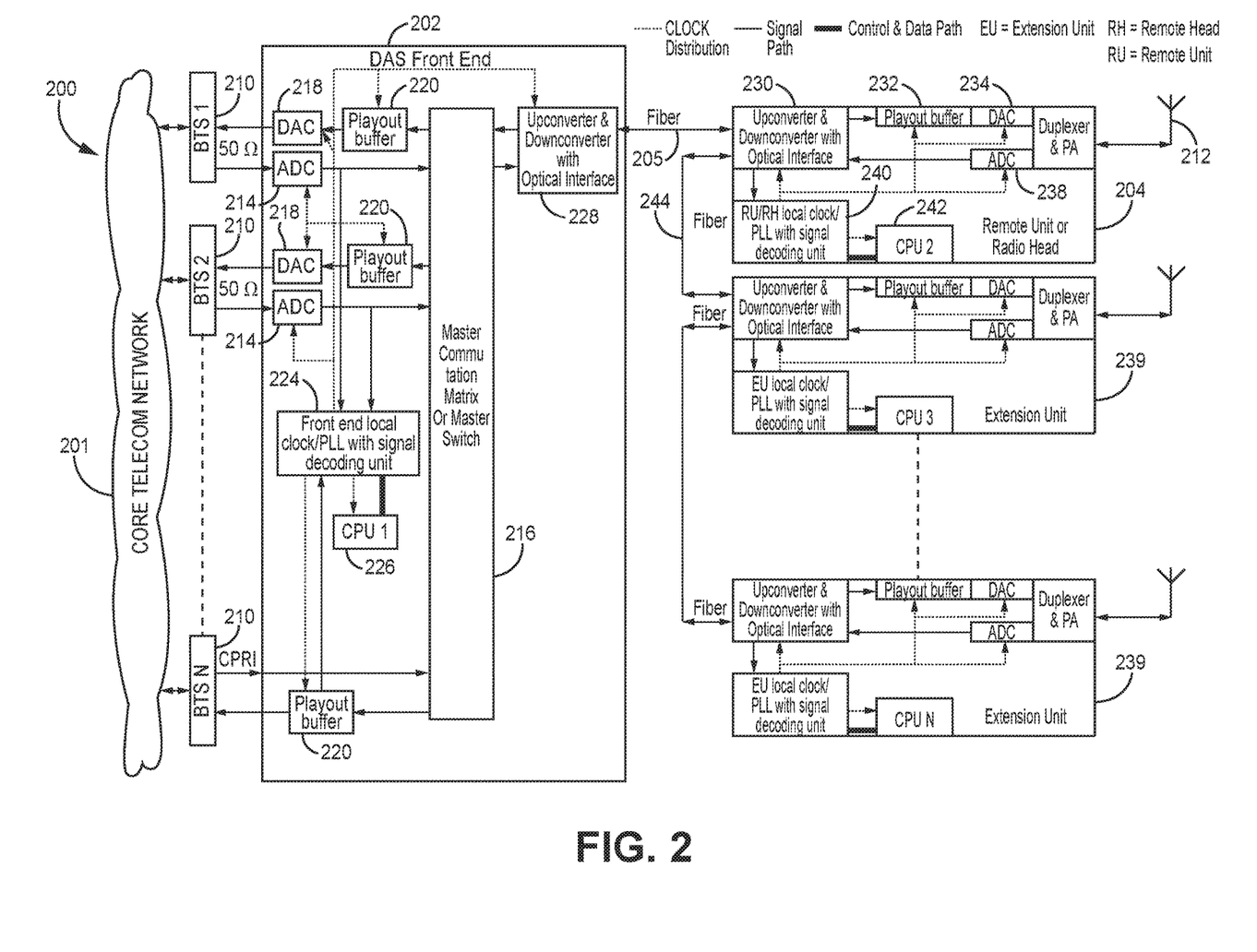
FIG. 2 is a block diagram of an example distributed antenna system for synchronization according to an aspect of the present disclosure.

FIG. 2 is a block diagram of an example DAS 200 according to some aspects of the present disclosure. The functions, structures, and other description of elements for such examples described herein may apply to like named elements of DAS 200 and vice versa. In exemplary embodiments, DAS 200 is a specific implementation of the DAS 100 described above with respect to FIG. 1.

In the example DAS 200 shown in FIG. 2, the front end unit 202 communicates signals with one or more base stations 210. In the downlink, the signals from the base stations 210 are processed by the analog-to-digital converters (ADC) to produce digital signals for distribution to other nodes of the DAS 200 by a switch matrix 216 of the front end unit 202. In some examples, the switch matrix 216 can also receive digital signals directly from a base station 210. and distributes the signals over the communication medium to the downlink nodes of the DAS. The switch matrix 216 provides the digital signals to a communication medium 205 via an interface 228 of the front end unit 202. In some examples, the interface 228 of the front end unit 202 is an optical interface and/or includes an upconverter/downconverter.

In the uplink, the switch matrix 216 receives digital signals from the downlink nodes and provides them to a respective playout buffer 220 for the particular base stations 210. The digital signals can be provided to the digital-to-analog converters (DACs) from the playout buffers 220 and transmitted to the base stations 210 or provided directly to the base stations 210.

In the example DAS 200 shown in FIG. 2, the front end unit 202 is communicatively coupled to a remote unit 204 via an optical fiber 205. It should be understood that other communication media could be used between the front end unit 202 and the remote unit 204. For example, a multi-conductor cable, coaxial cable, or the like could be used.

In the example DAS 200 shown in FIG. 2, the remote unit 204 includes an optical interface 230 with an upconverter and downconverter. In the downlink, the digital signals received over the communication medium 205 are upconverted and passed to the playout buffer 232 for synchronous transmission. From the playout buffer 232, the signals are converted to analog signals with a DAC 234, amplified, and transmitted via the antenna 212 of the remote unit 204. In the uplink, wireless RF signals are received from mobile units via the antenna of the remote unit 204 and converted to digital signals with an ADC 238. The digital signals are downconverted and provided to the communication medium via the optical interface 230 of the remote unit 204.

In the example DAS 200 shown in FIG. 2, the remote unit 204 is shown having other remote units 239 (also referred to herein as "extension units") communicatively coupled to it in a daisy chain. In operation, the remote units 204, 239 could be used for MIMO transmissions, for example. The remote unit 204 is communicatively coupled to the remote units 239 using a fiber optic cable 244. It should be understood that other communication media could be used between the remote units 204, 239. For example, a multi-conductor cable, coaxial cable, or the like could be used. In such an implementation, the remote units 239 are coupled to the front end unit 202 via the remote unit 204.

Figure 3:
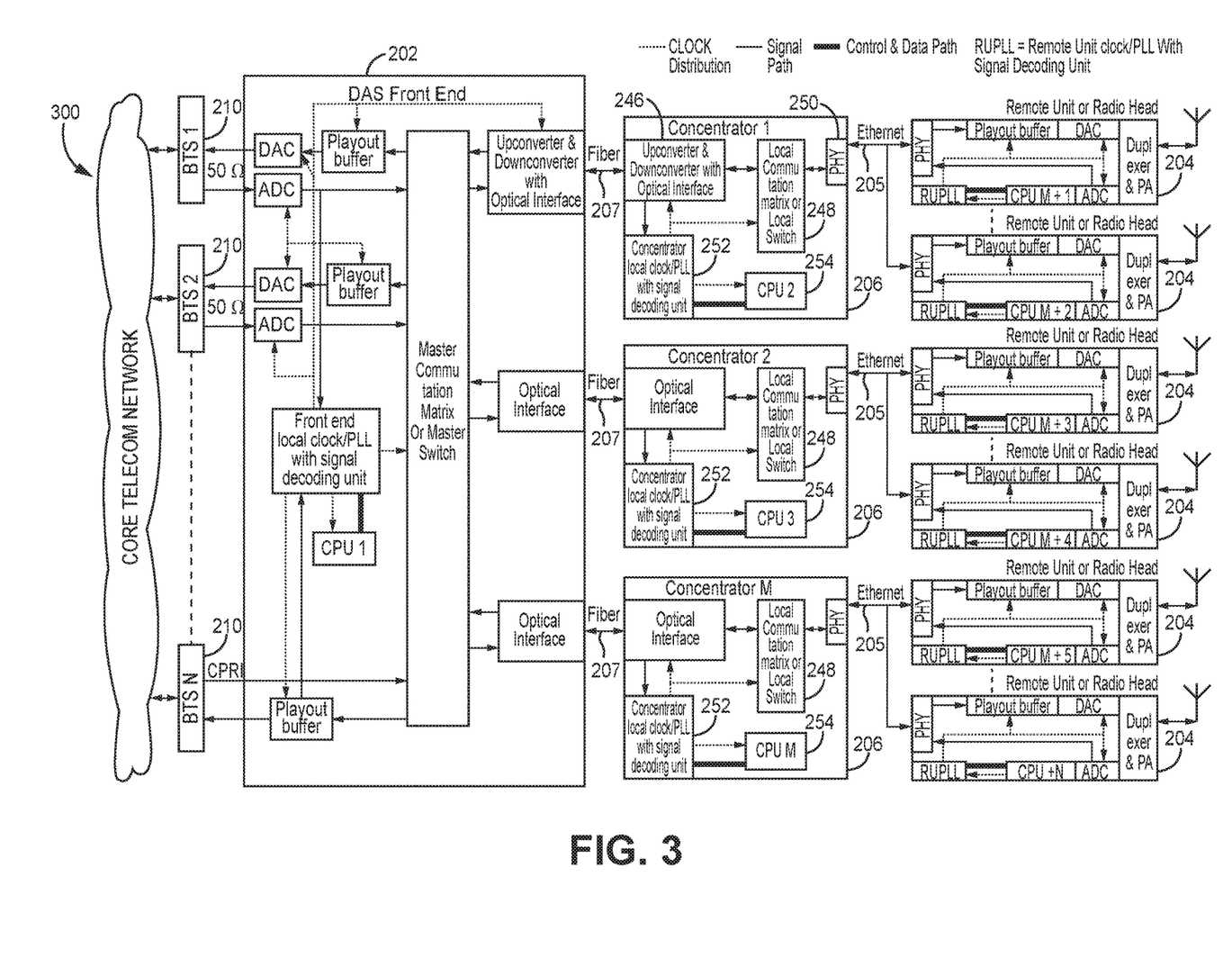
FIG. 3 is a block diagram of an example distributed antenna system for synchronization according to an aspect of the present disclosure.

FIG. 3 is a block diagram of an example DAS 300 according to some aspects of the present disclosure. The functions, structures, and other description of elements for such examples described herein may apply to like named elements of DAS 300 and vice versa. In exemplary embodiments, DAS 300 is a specific implementation of the DAS 100 described above with respect to FIG. 1. The example DAS in FIG. 3 is also similar to the example DAS 200 described above with respect to FIG. 2, so only the differences will be discussed.

The DAS 300 includes a concentrator 206 (also referred to herein as an "intermediate unit") between the front end unit 202 and the remote units 204. In the example DAS of FIG. 3, the concentrators 206 are communicatively coupled to the front end unit 202 using a fiber optic cable 207. The concentrators 206 include an optical interface 246 for communicating signals with the front end unit 202. In some examples, the concentrator 206 includes a switch matrix 248 (also referred to as a "commutation matrix") for directing downlink signals and combining uplink signals. In the example DAS of FIG. 3, the concentrators 206 include a physical layer (PHY) device 250 and particularly an Ethernet PHY. It should be understood that other communication media could be used between the concentrator 206 and the remote units 204 and therefore other interfaces at the concentrator 206 and the remote units 204 could be used.

In some examples, the optical interface of the concentrator 206 includes an upconverter and downconverter. In the downlink, the digital signals received from the front end unit 202 are upconverted and provided to the switch matrix 248. In the uplink, digital signals received from the remote units 204 and combined at the switch matrix 248 are downconverted and provided to the communication medium 207 via the optical interface 246 of the concentrator 206.

In operation, synchronization of the internal clocks of the nodes of the DAS to the base station clock and each other is critical for proper decoding of signals and synchronous transmission. In some aspects, the example distributed antenna systems discussed herein perform distributive synchronization where every node has capacity to synchronize itself based on a standardized RF signal generated by the base station 210. Synchronization is achieved without generation of master clock at the front end unit 202 and without distribution of a master clock as separate carrier or embedded signal together with the base station RF signal. Synchronization to base station clock is done during signal decoding, and the phase error of the decoded signal is calculated. Using the calculated phase error, the local phase locked loop (PLL) oscillator is tuned in a manner that phase error tends to equalize to zero. By equalizing the phase error to zero, the front end unit 202 and other units 204, 206, 239 of the DAS achieve frequency and timing synchronization.

The front end unit 202 is configured to distribute a message to each respective node of the DAS to enable distributive synchronization, which includes a list of service frequencies and applied standards in the base station signals forwarded to the respective node. This information is used as the source for signal decoding at the nodes of the DAS, which leads to synchronization of the internal clocks of the nodes to the base station clock. The list of applied standards can include, for example, UMTS, GSM, LTE, or other standards. The service frequencies can include, for example, different frequency bands utilized by base stations for the particular applied standards. In some examples, the list of services includes ARFCN, applied standards, cell ID, or other information regarding deployed signal. In some examples, the list of service frequencies and applied standards includes absolute radio-frequency channel numbers (ARFCNs), frequency bands, frequency ranges, or other information regarding service frequencies. In some examples, the list in the message will contain information about a minimum of two of the highest quality clocks from the decoded base station signal (highest quality deployed ARFCNs from highest quality connected base stations) or a manually loaded list of ARFCNs and standards (ARFCN frequencies and applied standards). In an example, the message from the front end unit to the nodes of the DAS includes the following:

| Services | UTRA | ARFCN | ARFCN frequency | Standard | Cell ID |
|---|---|---|---|---|---|
| 1 | 8 | 5 | 936 MHz | GSM | 12845 |
| 2 | 8 | 75 | 950 MHz | UMTS | 33646 |

When synchronizing the internal clock of the nodes 202, 204, 206 of the DAS, downlink signals received from the base station 210 are passed to the local clock/phase locked loop with signal decoding unit 224, 240, 252 of the nodes. In exemplary embodiments, the local clock/phase locked loop with signal decoding unit 224, 240, 252 includes a DAC and a voltage controlled oscillator (VCOX) used as the internal clock signal. In some examples, the downlink signals do not pass through any filters and/or buffers prior to being received by the signal decoding units. In this way, the precision of the synchronization of the internal clock of the nodes of the DAS are not degraded by the jitter and/or phase noise introduced by filters and buffers.

After receiving the message from the front end unit 202, each respective node of the DAS uses the list of service frequencies and applied standards specific to the particular base station signals forwarded to it for decoding the base station signals. The intermediate unit and/or remote units 204 synchronize their internal clocks to the base station clock by extracting the base station clock signal from the frames used for sending the payload data.

After the remote units 204 are synchronized to the base station clock, the front end unit 202 and/or the intermediate unit communicatively coupled to remote units 204 are configured to measure the clock phase noise for a remote unit 204 using unique remote unit ID and residual timestamp in uplink signals. In some examples, the phase error of decoded signal is caused by a synchronization error between two peers. Clock phase noise can be calculated during signal decoding. The influence of clock jitter can be described in following equation:

$$SNR = -20*\log_{10}[2*\pi*f_{analog}*t_{jitterRMS}] \text{ dB}$$

In some examples, the remote units 204 in the DAS are configured to add a residual timestamp to uplink payload packets and/or send packets in the payload frequency band to facilitate determination of path delay variation and clock phase noise of the remote units 204. The remote units 204 in the DAS are also assigned a unique identifier (ID) and add the unique ID to the uplink payload packets as well. The unique ID could be, for example, the media access control (MAC) address for the remote unit 204. When nodes that are upstream from the remote unit 204 (for example, the concentrator 206 and/or front end unit 202) receive the uplink payload packets from the remote units 204, the residual timestamp can be extracted and used for maintaining synchronization of the remote unit internal clock with the base station clock or determining path delay on a run-time basis.

In some examples, the front end unit 202 and/or concentrator 206 is configured to send information to a remote unit 204 for fine tuning of the phase locked loop (PLL) of the remote unit 204. For example, the front end unit 202 and/or concentrator 206 can send a corrective value for the PLL DAC of the remote unit 204, which controls the voltage controlled oscillator (VCOX) used as the internal clock signal for the remote unit 204. In some examples, other automatic frequency control methodology known to those having skill in the art may be utilized.

In some examples, the concentrators 206 in the DAS 300 are also configured to add a residual timestamp to uplink payload packets and/or send packets in the payload frequency band to facilitate determination of path delay variation and/or clock phase noise for the concentrators 206. The concentrators 206 in the DAS 300 are also assigned a unique identifier (ID) and add the unique ID to the uplink payload packets as well. For example, the unique ID could be the media access control (MAC) address for the concentrator 206. When the front end unit 202 receives the uplink payload packets from the concentrators 206, the residual timestamp can be extracted and used for maintaining synchronization of the concentrator internal clock with the base station clock or determining path delay on a run-time basis. In some examples, the front end unit 202 is configured to measure the uplink signal clock phase noise of all attached concentrators 206 using unique IDs and residual timestamps in uplink signals. The phase error of IQ data that contains the unique ID is directly influenced by synchronization error.

In some examples, the front end unit 202 is configured to send information to a concentrator 206 for fine tuning the PLL of the concentrator 206. For example, the front end unit 202 can send a corrective value for PLL DAC of the concentrator, which controls the voltage controlled oscillator (VCOX) used as the internal clock signal of the concentrator 206. In some examples, other automatic frequency control methodology known to those having skill in the art may be utilized.

For legacy remote units or remote units with lower processing capabilities, certain functionality of the remote units 204 described above may not be possible. For example, some remote units may not be capable of extracting the base station clock signal from the signal from the base station. It may be desirable for the front end unit 202 to be able to accommodate the legacy or less capable remote units in the context of the distributed antenna system described herein. Further, it may also be desirable for the front end unit 202 to take control of system synchronization without influence of the base station signal in certain circumstances.

Accordingly, the front end unit 202 can be configured to send one or more synchronization messages to remote units that enable a remote unit to synchronize with the base station signal even without the capacity to extract the base station clock from the base station signal. In some examples, the synchronization message from the front end unit 202 includes a residual timestamp and information for fine tuning of the phase locked loop (and generally the internal clock) of the remote unit. For example, the synchronization message from the front end unit 202 can include the residual timestamp and a corrective value for the PLL DAC of the remote unit, which controls the voltage controlled oscillator (VCOX) used as the internal clock signal for the remote unit. In some examples, the front end unit 202 also distributes the base station clock to such remote units. The remote units can be configured to synchronize and fine tune the internal clock using the information in the synchronization message from the front end unit 202. In some examples, the remote units can be further configured to send an uplink packet or other message to the front end unit 202 that can be used to optimize the fine tuning of the internal clock of the remote unit. For example, the remote units can be configured to add a residual timestamp to uplink payload packets and/or send packets in the payload frequency band to facilitate determination of path delay variation and clock phase noise of the remote units in a similar manner to that described above.

In some examples, the front end unit 202 is further configured to send messages to remote units for fine tuning playout delay to the air interface at the playout buffers 232 of the remote unit 204. For example, the messages may include an offset for the playout delay of the playout buffers 232, an adjustment to the dimension of the playout buffers 232, or some other modification to the playout buffers 232 for synchronize forwarding of the base station signal to the air interface by the remote units 204.

After commissioning the DAS and synchronizing the nodes of the DAS to the base station clock, there will inevitably be a failure of hardware components for some nodes of the DAS. For example, one or more of the remote units may experience a hardware failure during operation that prevents the transmission of wireless signals between the one or more base stations communicatively coupled to the DAS and the mobiles in the coverage zone of the failed remote unit. When such a failure occurs, it is common for the mobiles in the coverage zone of the failed remote unit to experience a drop in service (for example, a dropped call).

Figure 4:
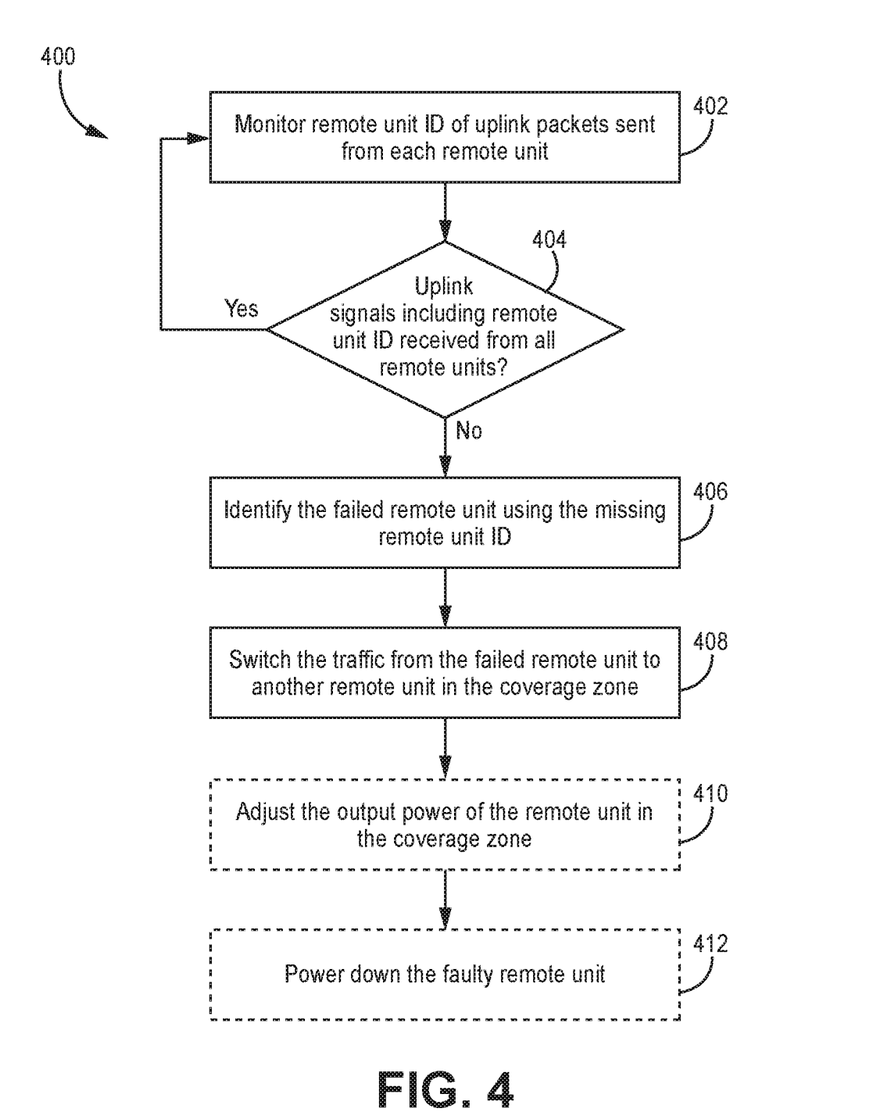
FIG. 4 is a flow chart of an example method of for fault management for nodes of a distributed antenna system according to an aspect of the present disclosure.

In order to prevent dropped calls and increase the quality of the user experience, embodiments of the present application include various methods for fault management in a DAS. FIG. 4 is a flow chart of an example method 400 of fault management for nodes of a DAS. The functions, structures, and other description of elements for such examples described herein may apply to like named elements of method 400 and vice versa. The exemplary embodiment shown in FIG. 4 is described herein as being implemented in the DASs 100, 200, 300 shown in FIGS. 1-3, though it is to be understood that other embodiments of method 400 can be implemented in other ways.

The method 400 begins with monitoring uplink packets for a remote unit identifier (ID) sent from each remote unit (block 402). The uplink packets are monitored by the front end unit and/or an intermediate unit of the DAS, and the uplink packets include the timestamps and remote unit ID. In exemplary embodiments, the remote unit ID includes the media access control (MAC) address of the remote unit or some other unique identifier assigned to a particular remote unit. In some examples, the uplink packets are sent at a scheduled time interval by the remote units.

The method proceeds with determining whether a remote unit ID has been detected from each remote unit of the DAS (block 404). In some examples, the front end unit includes a list of remote unit IDs for all remote units of the DAS stored in memory. In such examples, the front end unit compiles a list of the remote unit IDs received at the scheduled time interval and compares the list of remote unit IDs stored in memory to the compiled list of received remote unit IDs to determine whether every remote unit ID has been received. In exemplary embodiments, a respective intermediate unit can also include a list of remote unit IDs for remote units coupled to the respective intermediate unit. In such embodiments, the intermediate unit can perform a similar comparison to that described above.

When a remote unit ID for each remote unit has been detected, then the method proceeds with monitoring the uplink packets (block 402). When a remote unit ID for each remote unit has not been detected, the method proceeds with identifying the faulty remote unit (block 406). If a remote unit ID for a particular remote unit is not received by the front end unit and/or the intermediate unit, that remote unit is identified as a faulty remote unit that was not received.

The method proceeds with switching the payload traffic for the failed remote unit to a non-faulty remote unit in the same coverage zone (block 408). In some examples, the switching decision for routing capacity (payload traffic) from the faulty remote unit to the non-faulty remote unit in the same coverage zone can be implemented in the front end unit itself or in a different node of the DAS. In some examples, the switching of capacity is implemented at the front end unit, intermediate unit, or both. In such examples, the front end unit and/or intermediate unit includes a switch matrix or other switching component to route the payload traffic or capacity to the remote units. Switching can be performed in intermediate unit or in front end unit since failure is detected in time interval shorter than 50 msec.

In some examples, the non-faulty remote unit is selected based on the proximity to the faulty remote unit. For example, the payload traffic of the faulty remote unit is switched to the nearest non-faulty remote unit in the same coverage zone. In some examples, the payload traffic of the faulty remote unit can be distributed amongst two or more non-faulty remote units in the same coverage zone.

The method optionally proceeds with adjusting the output power of the remote unit receiving the payload traffic from the failed remote unit (block 410). While the non-faulty remote unit(s) are positioned in the same coverage zone as the faulty remote unit, it is likely that the mobiles previously communicating wireless signals with the faulty remote unit will be farther away from the non-faulty remote unit(s). In order to achieve a satisfactory signal-to-noise ratio for those mobiles, the output power may be increased for the non-faulty remote unit(s) receiving the payload traffic for the faulty remote unit. The method also optionally proceeds with powering down the faulty remote unit(s) after switching (block 412).

Figure 5:
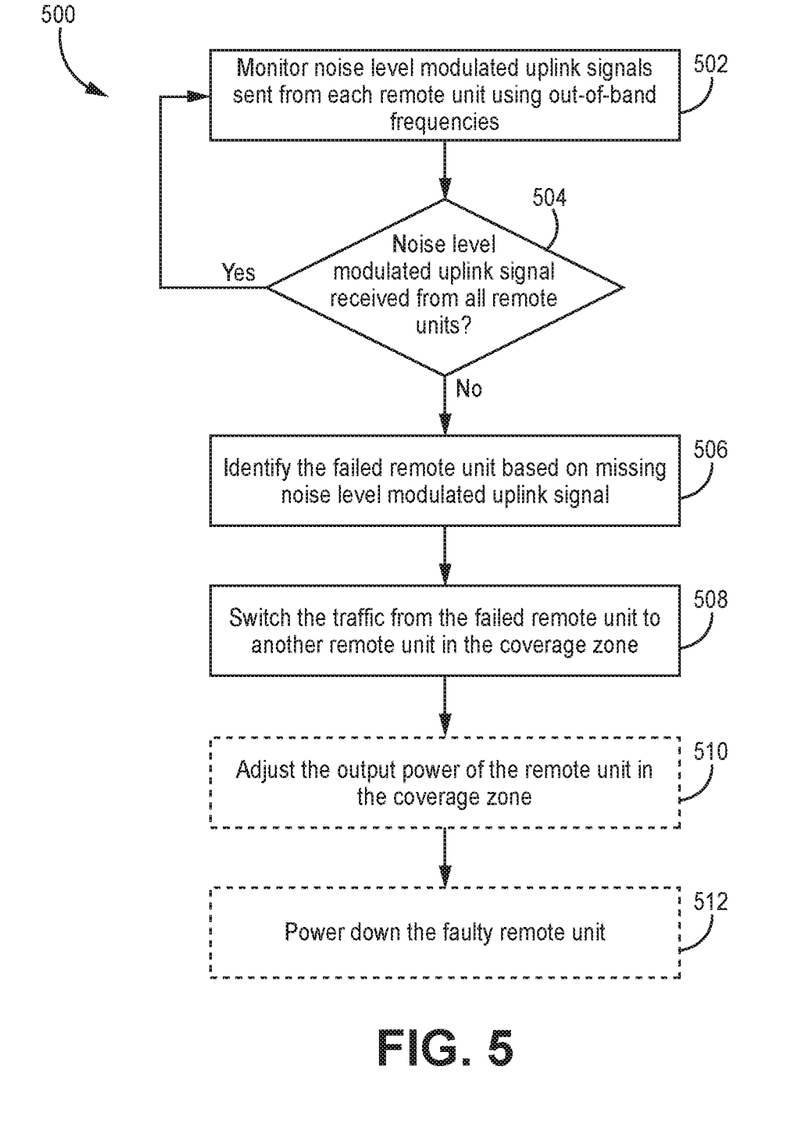
FIG. 5 is a flow chart of an example method for fault management for nodes of a distributed antenna system according to an aspect of the present disclosure.

In some embodiments, the remote units are configured to send noise level modulated uplink signals to the front end unit using out-of-band signals in addition to, or instead of, the remote unit ID and residual timestamps discussed above. The out-of-band signals include free frequencies that are not used for uplink communication of payload data. FIG. 5 is a flow chart of an example method 500 of fault management for nodes of a DAS using noise level modulated uplink signals. The functions, structures, and other description of elements for such examples described herein may apply to like named elements of method 500 and vice versa.

The method 500 begins with monitoring the uplink communication path for noise level modulated uplink signals sent from the remote units (block 502). The noise level modulated uplink signals are sent using frequencies outside of the payload frequency band. The noise level modulated uplink signals are tones generated by the remote units and/or concentrators of the DAS. In some examples, each node of the DAS provides the noise level modulated uplink signal using a frequency unique to that particular node. In some examples, the front end unit is monitors the uplink communication path for the noise level modulated uplink signals provided by the remote units and/or concentrators of the DAS. In some examples, the concentrator monitors the uplink communication path for the noise level modulated uplink signals from remote units communicatively coupled to the concentrator.

The method proceeds with determining whether a noise level modulated uplink signal has been received from all remote units (block 504). In some examples, the front end unit and/or the intermediate unit includes a list of the frequencies used by the remote units in order to determine which remote units have provided the noise level modulated uplink signal. In such examples, the front end unit compiles a list of the frequencies received at the scheduled time interval and compares the list of frequencies stored in memory to the compiled list of received frequencies to determine whether every remote unit has provided an uplink signal. In exemplary embodiments, a respective intermediate unit can also include a list of frequencies for remote units coupled to the respective intermediate unit. In such embodiments, the intermediate unit can perform a similar comparison to that described above.

When a noise level modulated uplink signal for each remote unit has been detected, then the method continues with monitoring the uplink communication path for the noise level modulated uplink signals (block 502). When a noise level modulated uplink signal for each remote unit has not been detected, the method proceeds with identifying which remote unit did not provide a noise level modulated uplink signal (block 506). The remote unit that did not provide a noise level modulated uplink signal is determined to be a faulty remote unit. In some examples, a faulty remote unit may have a hardware failure, or some other fault that renders the remote unit incapable of exchanging packets with the front end unit and/or intermediate unit.

The method proceeds with switching the payload traffic for the faulty remote unit to non-faulty remote unit in the same coverage zone (block 508). In some examples, the switching of the payload traffic or capacity of the faulty remote unit occurs at the front end unit. For example, the front end unit detects the faulty remote unit or receives a signal identifying the faulty remote unit and switches the path for the payload traffic to a non-faulty remote unit. In other examples, the switching of the payload traffic or capacity of the fault remote unit occurs at the intermediate unit of the DAS. In such examples, the intermediate unit includes a switch matrix or other switching component to route the payload traffic or capacity to the remote units communicatively coupled to the intermediate unit.

In some examples, the non-faulty remote unit is selected based on the proximity to the faulty remote unit. For example, the payload traffic of the faulty remote unit is switched to the nearest non-faulty remote unit in the same coverage zone. In some examples, the payload traffic of the faulty remote unit can be distributed amongst two or more non-faulty remote units in the same coverage zone.

The method optionally proceeds with adjusting the output power of the remote unit receiving the payload traffic from the failed remote unit (block 510). While the non-faulty remote unit(s) are positioned in the same coverage zone as the faulty remote unit, it is likely that the mobiles previously communicating wireless signals with the faulty remote unit will be farther away from the non-faulty remote unit(s). In order to achieve a satisfactory signal-to-noise ratio for those mobiles, the output power can be increased for the non-faulty remote unit(s) receiving the payload traffic for the faulty remote unit. The method also optionally proceeds with powering down the faulty remote unit(s) (block 512).

While methods 400, 500 are discussed with respect to detecting faults with a remote unit, it is understood that similar techniques could also be used to detect faults of other nodes of the DAS as well. For example, the front end unit can be configured to monitor uplink signals for unique IDs or noise level modulated uplink signals from intermediate units, extension units attached to a remote unit, or a remote radio head.

Figure 6:
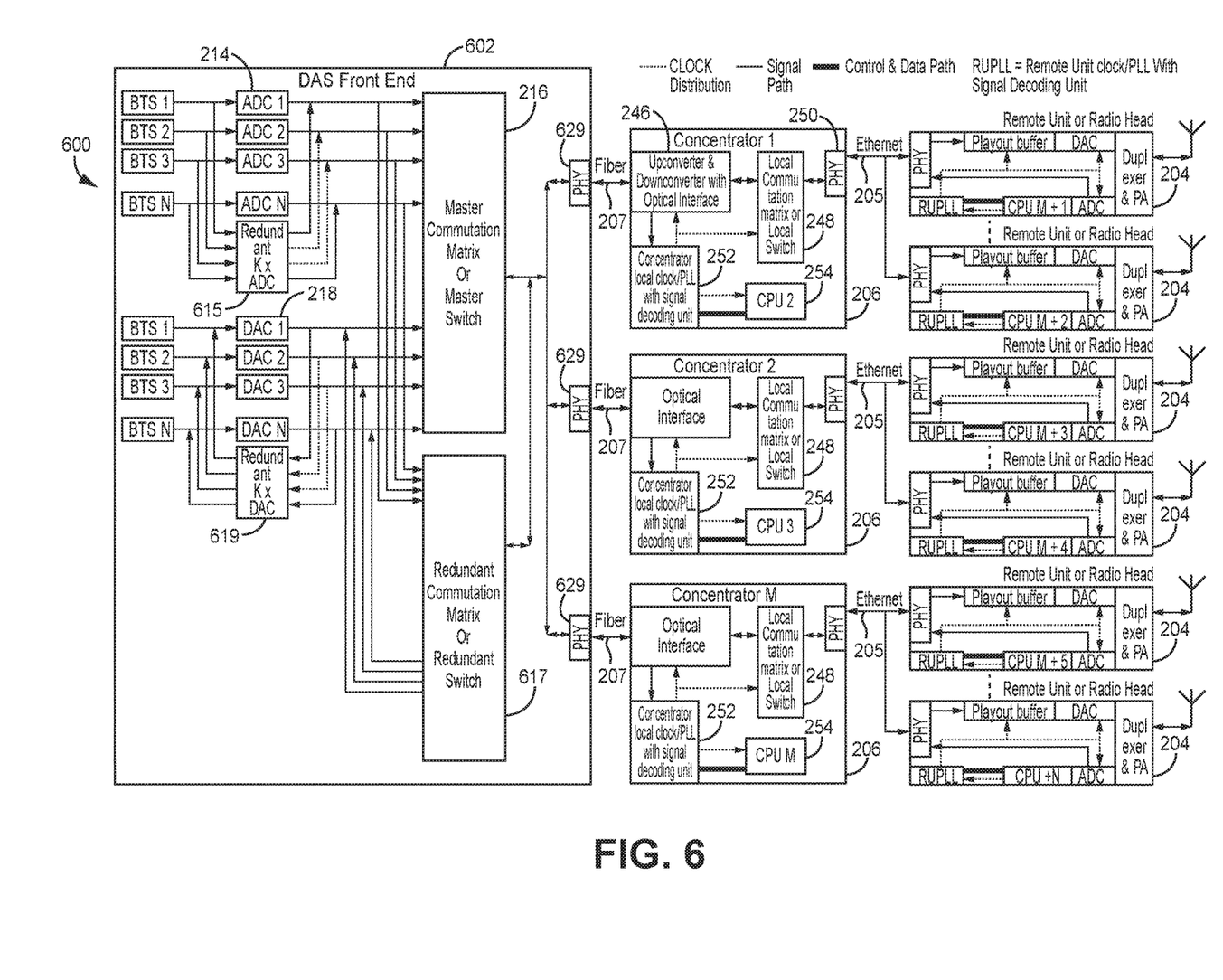
FIG. 6 is a block diagram of an example distributed antenna system for fault management according to an aspect of the present disclosure.

FIG. 6 is a block diagram of an example DAS 600 according to some aspects of the present disclosure. The functions, structures, and other description of elements for such examples described herein may apply to like named elements of DAS 600 and vice versa. In exemplary embodiments, DAS 600 is a specific implementation of the DAS 100 described above with respect to FIG. 1. The example DAS in FIG. 6 is also similar to the example DAS 200, 300 described above with respect to FIG. 2-3, so only the differences will be discussed.

In the example DAS 600 shown in FIG. 6, the front end unit 602 includes both primary and backup hardware components to provide a fault tolerant hardware design. The primary and backup hardware components are both communicatively coupled to the base stations 210 and the other nodes of the DAS 600, but are not operational at the same time. In the downlink, the front end unit 602 includes primary ADCs and backup ADCs communicatively coupled to the base stations 210. In the uplink, the front end unit 602 includes primary DACs and backup DACs communicatively coupled to the base stations 210. In some examples, the front end unit 602 also includes a primary switch matrix 216 and a backup switch matrix.

The front end unit 602 is configured to detect a failure of the primary hardware components and switch from the primary hardware component to the backup hardware component upon detection of the failure. In some aspects, the front end unit 602 is configured to perform fast switching from the faulty primary hardware component to a non-faulty backup component. For example, the switching speed of the front end unit 602 is sufficient to avoid a dropped call or dropped data connection between the base station 210 and a mobile unit 208.

In some examples, the front end unit 602 can detect the failure of an ADC or DAC based on a loss of data received from the base station or from another node of the DAS. In some examples, the front end unit 602 can detect the failure of an ADC or DAC based on a loss of synchronization of data from the primary hardware component with the clock of the front end unit 602. In some examples, the front end unit 602 can detect the failure of an ADC based on an error of an ADC bit detected using a forward error correction algorithm.

In various aspects, system elements, method steps, or examples described throughout this disclosure (such as the master unit, expansion units, remote antenna units, or components thereof, for example) may be implemented on one or more computer systems, field programmable gate array (FPGA), application specific integrated circuit (ASIC) or similar devices or circuits or circuitry comprising hardware executing code to realize those elements, processes, or examples, said code stored on a non-transient data storage device. These devices include or function with software programs, firmware, or other computer readable instructions for carrying out various methods, process tasks, calculations, and control functions, used for synchronization and fault management in a distributed antenna system.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

EXAMPLE EMBODIMENTS

Example 1 includes a distributed antenna system, comprising: a master unit communicatively coupled to a base station; and a remote unit communicatively coupled to the master unit via a communication medium and located remotely from the master unit, wherein the remote unit includes an internal clock; wherein the master unit is configured to: send a message to the remote unit including a list of service frequencies and applied standards for the base station; send a downlink signal generated based on a base station signal to the remote unit; wherein the remote unit is configured to: decode the downlink signal based on the list of service frequencies and applied standards for the base station; extract a base station clock signal from the downlink signal; and synchronize the internal clock to the base station clock using the extracted base station clock signal.

Example 2 includes the distributed antenna system of Example 1, wherein the remote unit is configured to decode the downlink signal and extract the base station clock signal prior to filtering or buffering the downlink signal.

Example 3 includes the distributed antenna system of any of Examples 1-2, wherein the remote unit is configured to send an uplink packet to the master unit at a scheduled time interval, wherein the uplink packet includes a residual timestamp and a remote unit identifier.

Example 4 includes the distributed antenna system of Example 3, wherein the master unit is configured to measure an amount of jitter or clock phase noise of the internal clock of the remote unit based on the residual timestamp.

Example 5 includes the distributed antenna system of Example 4, wherein the master unit is configured to provide correction information to the remote unit based on the measured jitter or clock phase noise of the internal clock of the remote unit.

Example 6 includes the distributed antenna system of any of Examples 3-5, wherein the master unit is configured to determine the path delay from the remote unit to the master unit on a run-time basis based on the residual timestamp.

Example 7 includes the distributed antenna system of any of Examples 1-6, wherein the remote unit comprises an intermediate unit, a remote antenna unit, an extension unit, or a remote radio head.

Example 8 includes the distributed antenna system of any of Examples 1-7, further comprising an intermediate unit communicatively coupled between the master unit and the remote unit.

Example 9 includes the distributed antenna system of Example 8, wherein the intermediate unit is configured to measure an amount of jitter or clock phase noise of the internal clock of the remote unit based on the residual timestamp and remote unit identifier.

Example 10 includes the distributed antenna system of Example 9, wherein the intermediate unit is configured to provide phase locked loop correction information to the remote unit based on the measured jitter or clock phase noise of the internal clock of the remote unit.

Example 11 includes the distributed antenna system of any of Examples 1-10, wherein the master unit comprises an analog radio frequency (RF) interface configured to receive an analog signal from the base station.

Example 12 includes the distributed antenna system of any of Examples 1-11, wherein the master unit comprises a digital interface configured to receive a digital signal from the base station.

Example 13 includes the distributed antenna system of any of Examples 1-12, wherein the list of service frequencies and applied standards includes one or more of: an absolute radio-frequency channel number; a frequency band; a frequency range; or a cell ID.

Example 14 includes the distributed antenna system of any of Examples 1-13, further comprising a second remote unit communicatively coupled to the master unit via a communication medium and located remotely from the master unit, wherein the second remote unit includes an internal clock; wherein the master unit is further configured to: send a synchronization message to the second remote unit including information regarding the base station clock and measured jitter or clock phase noise of the internal clock of the second remote unit; send a message to the second remote unit including adjustments to playout delay of a playout buffer of the second remote unit; wherein the second remote unit is configured to: synchronize the internal clock of the second remote unit to the base station clock using the information in the synchronization message received from master unit; and adjust the playout delay of the playout buffer of the second remote unit based on the message from the master unit.

Example 15 includes a remote unit of a distributed antenna system, comprising: an interface communicatively coupled to a front end unit over a communication medium, wherein the remote unit is configured to receive a message from a front end unit of the distributed antenna system that includes a list of service frequencies and applied standards for a base station, wherein the remote unit is configured to receive a downlink signal generated based on a base station signal to the remote unit, wherein the front end unit is communicatively coupled to the base station and the remote unit, wherein the remote unit is located remotely from the front end unit; a processor coupled to a memory, wherein the processor is configured to: decode the downlink signal based on the list of service frequencies and applied standards for the base station to produce a decoded downlink signal; extract a base station clock signal from the decoded downlink signal to produce an extracted base station clock signal; synchronize an internal clock of the remote unit to the base station clock using the extracted base station clock signal.

Example 16 includes the remote unit of Example 15, wherein the remote unit is further configured to send an uplink packet from the remote unit to at least one of the front end unit or an intermediate unit communicatively coupled to the remote unit at a scheduled time interval, wherein the uplink packet includes a residual timestamp and a remote unit identifier.

Example 17 includes the remote unit of Example 16, wherein the remote unit is further configured to adjust the internal clock of the remote unit based on the correction information provided from at least one of the front end unit or the intermediate unit, wherein the correction information is based on a measured amount of jitter or clock phase noise of the internal clock of the remote unit.

Example 18 includes the remote unit of any of Examples 16-17, wherein the remote unit identifier comprises a media access control address of the remote unit.

Example 19 includes the remote unit of any of Examples 15-18, wherein the remote unit comprises an intermediate unit, a remote antenna unit, an extension unit, or a remote radio head.

Example 20 includes the remote unit of any of Examples 15-19, wherein the list of service frequencies and applied standards includes at least one of: absolute radio-frequency channel numbers; frequency bands; or frequency ranges.

Example 21 includes a distributed antenna system, comprising: a plurality of remote units, wherein each remote unit of the plurality of remote units is configured to communicate an uplink signal over a communication medium, wherein the uplink signal comprises a packet including a remote unit identifier that is unique to the respective remote unit; a front end unit located remotely from the plurality of remote units and communicatively coupled to the plurality of remote units, wherein the front end unit is configured to: monitor the uplink signal communicated over the communication medium by each of the plurality of remote units; determine whether the uplink signal is received from each remote unit of the plurality of remote units based on the remote unit identifiers received at the front end unit; and when the uplink signal is not received from each remote unit of the plurality of remote units, identify a faulty remote unit based on a remote unit identifier that is not received by the front end unit; wherein the distributed antenna system is configured to switch downlink payload traffic for the faulty remote unit to a non-faulty remote unit in a coverage zone of the faulty remote unit.

Example 22 includes the distributed antenna system of Example 21, wherein the remote unit identifier unique to the respective remote unit comprises a media access control address of the respective remote unit.

Example 23 includes the distributed antenna system of any of Examples 21-22, wherein the front end unit comprises a memory including a list of remote unit identifiers, wherein the front end unit is configured to determine whether the uplink signal is received from each remote unit of the plurality of remote units by comparing the remote unit identifiers received at the front end unit to the list of remote unit identifiers in the memory.

Example 24 includes the distributed antenna system of any of Examples 21-23, wherein at least one of the front end unit or an intermediate unit communicatively coupled to the remote unit is configured to switch the downlink payload traffic for the faulty remote unit to another remote unit in the coverage zone of the faulty remote unit.

Example 25 includes the distributed antenna system of any of Examples 21-24, wherein the distributed antenna system is configured to switch the downlink payload traffic for the faulty remote unit to at least two non-faulty remote units in the coverage zone of the faulty remote unit.

Example 26 includes the distributed antenna system of any of Examples 21-25, wherein the remote unit comprises a remote antenna unit, an extension unit, or a remote radio head.

Example 27 includes a master unit of a distributed antenna system, comprising: an first interface communicatively coupled to one or more base stations; one or more second interfaces communicatively coupled to a plurality of remote units over a communication medium; a processor coupled to a memory, wherein the processor is configured to: monitor the uplink signal communicated over the communication medium by each of the plurality of remote units; determine whether the uplink signal is received from each remote unit of the plurality of remote units based on the remote unit identifiers received at the master unit; when the uplink signal is not received from each remote unit of the plurality of remote units, identify a faulty remote unit based on a remote unit identifier that is not received by the master unit; and switch downlink payload traffic for the faulty remote unit to another remote unit in a coverage zone of the faulty remote unit.

Example 28 includes the master unit of Example 27, configured to switch the downlink payload traffic for the faulty remote unit to non-faulty remote unit in the coverage zone of the faulty remote unit by sending a control signal to an intermediate unit communicatively coupled to the faulty remote unit.

Example 29 includes the master unit of any of Examples 27-28, wherein the remote unit identifier unique to the respective remote unit comprises a media access control address of the respective remote unit.

Example 30 includes the master unit of any of Examples 27-29, wherein the master unit comprises a memory including a list of remote unit identifiers, wherein the master unit is configured to determine whether the uplink signal is received from each remote unit of the plurality of remote units by comparing the remote unit identifiers received at the master unit to the list of remote unit identifiers in the memory.

Example 31 includes a master unit of a distributed antenna system, comprising: a first hardware component in a communication path of the master unit; a second hardware component in the communication path of the master unit, wherein the second hardware component in the communication path is a redundant component; wherein the master unit is configured to: detect a failure of the first hardware component in the communication path of the master unit; and upon detection of the failure of the first hardware component in the communication path of the master unit, switch from the first hardware component to the second hardware component.

Example 32 includes the master unit of Example 31, wherein the first hardware component and the second hardware component comprise an analog-to-digital converter, a digital-to-analog converter, or a switch matrix.

Example 33 includes the master unit of any of Examples 31-32, wherein the first hardware component and the second hardware component comprise an analog-to-digital converter, wherein the master unit is configured to detect the failure of the first hardware component based on at least one of a loss of data or a loss of synchronization of data from the first hardware component with a clock of the master unit.

Example 34 includes the master unit of any of Examples 31-33, wherein the first hardware component and the second hardware component comprise an analog-to-digital converter, wherein the master unit is configured to detect the failure of the first hardware component based on an error of an analog-to-digital converter bit detected using a forward error correction algorithm.

Example 35 includes the master unit of any of Examples 31-34, wherein the first hardware component and the second hardware component comprise a digital-to-analog converter.

Example 36 includes the master unit of any of Examples 31-35, wherein the first hardware component and the second hardware component comprise a switch matrix.

Example 37 includes the master unit of any of Examples 31-36, wherein the master unit is configured to switch from the first hardware component to the second hardware component at a speed that is sufficient to avoid a dropped call or dropped data connection between a base station and a mobile unit utilizing the distributed antenna system.

Example 38 includes a distributed antenna system, comprising: a master unit communicatively coupled to a base station; and a remote unit communicatively coupled to the master unit via a communication medium and located remotely from the master unit, wherein the remote unit includes an internal clock; wherein the master unit is configured to: send a synchronization message to the remote unit including information regarding the base station clock and measured jitter or clock phase noise of the internal clock; send a message to the remote unit including adjustments to playout delay of a playout buffer of the remote unit; wherein the remote unit is configured to: synchronize the internal clock to the base station clock using the information in the synchronization message received from master unit; and adjust the playout delay of the playout buffer of the remote unit based on the message from the master unit.

Example 39 includes the distributed antenna system of Example 38, wherein the remote unit is configured to send an uplink packet to the master unit at a scheduled time interval, wherein the uplink packet includes a residual timestamp and a remote unit identifier; wherein the master unit is configured to measure the amount of jitter or clock phase noise of the internal clock of the remote unit based on the residual timestamp.

Example 40 includes the distributed antenna system of any of Examples 38-39, wherein information regarding the measured jitter or clock phase noise of the internal clock comprises correction information to minimize the jitter or clock phase noise of the internal clock of the remote unit.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method, comprising:
   sending a message from a master unit of a distributed antenna system to a remote unit of the distributed antenna system, wherein the message includes a list of service frequencies and applied standards for a base station;
   sending a downlink signal generated based on a base station signal from the master unit to the remote unit;
   decoding, at the remote unit, the downlink signal based on the list of service frequencies and applied standards for the base station;
   extracting, at the remote unit, a base station clock signal from the decoded downlink signal to produce an extracted base station clock signal; and
   synchronizing, at the remote unit, an internal clock of the remote unit to a base station clock using the extracted base station clock signal.

2. The method of claim 1, further comprising decoding the downlink signal and extracting the base station clock signal prior to filtering or buffering the downlink signal.

3. The method of claim 1, further comprising sending an uplink packet from the remote unit to the master unit at a scheduled time interval, wherein the uplink packet includes a residual timestamp and a remote unit identifier.

4. The method of claim 3, further comprising measuring an amount of jitter or clock phase noise of the internal clock of the remote unit based on the residual timestamp.

5. The method of claim 4, further comprising providing correction information to the remote unit based on the measured jitter or clock phase noise of the internal clock of the remote unit.

6. The method of claim 3, further comprising determining a path delay from the remote unit to the master unit on a run-time basis based on the residual timestamp.

7. The method of claim 1, wherein the remote unit comprises an intermediate unit, a remote antenna unit, an extension unit, or a remote radio head.

8. The method of claim 1, further comprising communicatively coupling an intermediate unit between the master unit and the remote unit.

9. The method of claim 8, further comprising measuring, with the intermediate unit, an amount of jitter or clock phase of the internal clock of the remote unit based on a residual timestamp and remote unit identifier.

10. The method of claim 9, further comprising providing phase locked loop correction information from the intermediate unit to the remote unit based on the measured jitter or clock phase noise of the internal clock of the remote unit.

11. The method of claim 1, further comprising receiving an analog signal from the base station with an analog radio frequency (RF) interface of the master unit.

12. The method of claim 1, further comprising receiving a digital signal from the base station with a digital interface of the master unit.

13. The method of claim 1, wherein the list of service frequencies and applied standards includes one or more of: an absolute radio frequency channel number; a frequency band; a frequency range; or a cell identifier.

14. The method of claim 1, further comprising:
   sending a synchronization message to a second remote unit of the distributed antenna system, wherein the second remote unit is communicatively coupled to the master unit via a second communication medium and located remotely from the master unit, wherein the second remote unit includes an internal clock;
   sending a message to the second remote unit including adjustments to playout delay of a playout buffer of the second remote unit;
   synchronizing the internal clock of the second remote unit to the base station clock using information in the synchronization message; and
   adjusting the playout delay of the playout buffer of the second remote unit based on the message.

15. A method, comprising:
   receiving a message from a front end unit of a distributed antenna system, wherein the message includes a list of service frequencies and applied standards for a base station;
   receiving a downlink signal that is generated based on a base station signal;
   decoding, at a remote unit communicatively coupled to the front end unit, the downlink signal based on the list of service frequencies and applied standards for the base station to produce a decoded downlink signal;
   extracting, at the remote unit, a base station clock signal from the decoded downlink signal to produce an extracted base station clock signal; and
   synchronizing, at the remote unit, an internal clock of a remote unit to a base station clock using the extracted base station clock signal.

16. The method of claim 15, further comprising sending an uplink packet to at least one of the front end unit or an intermediate unit at a scheduled time interval, wherein the uplink packet includes a residual timestamp and a remote unit identifier, wherein the remote unit identifier comprises a media access control address of the remote unit.

17. The method of claim 16, further comprising adjusting the internal clock of the remote unit based on correction information provided from at least one of the front end unit or the intermediate unit, wherein the correction information is based on a measured amount of jitter or clock phase noise of the internal clock of the remote unit.

18. A method, comprising:
sending a synchronization message from a master unit of a distributed antenna system to a remote unit of the distributed antenna system, wherein the synchronization message includes information regarding a base station clock and measured jitter or clock phase of an internal clock of the remote unit;
sending a message to the remote unit including adjustments to playout delay of a playout buffer of the remote unit;
synchronizing the internal clock to the base station clock using the information in the synchronization message received from the master unit; and
adjusting the playout delay of the playout buffer of the remote unit based on the message from the master unit.

19. The method of claim 18, further comprising:
sending an uplink packet to the master unit at a scheduled time interval, wherein the uplink packet includes a residual timestamp and a remote unit identifier; and
measuring an amount of jitter or clock phase of the internal clock of the remote unit based on the residual timestamp.

20. The method of claim 18, wherein information regarding the measured jitter or clock phase of the internal clock comprises correction information to minimize the jitter or clock phase of the internal clock of the remote unit.

* * * * *